(12) United States Patent
Reynolds et al.

(10) Patent No.: US 7,743,982 B2
(45) Date of Patent: Jun. 29, 2010

(54) TRANSACTION PRODUCT WITH GENERATOR

(75) Inventors: Adam W. Reynolds, Minneapolis, MN (US); Erin M. Borkowski, Andover, MN (US); Timothy P. Clegg, Manhatten Beach, CA (US); Primoz Samardzija, Marina del Ray, CA (US)

(73) Assignee: Target Brands, Inc., Minneapolis, MN (US)

( * ) Notice: Subject to any disclaimer, the term of this patent is extended or adjusted under 35 U.S.C. 154(b) by 467 days.

(21) Appl. No.: 11/931,961

(22) Filed: Oct. 31, 2007

(65) Prior Publication Data

US 2009/0108079 A1   Apr. 30, 2009

(51) Int. Cl.
*G06K 5/00* (2006.01)

(52) U.S. Cl. .................. 235/380; 235/487; 235/375; 235/382

(58) Field of Classification Search .......... 235/375, 235/380, 382, 487
See application file for complete search history.

(56) References Cited

U.S. PATENT DOCUMENTS

| | | | |
|---|---|---|---|
| 2,535,041 A | 12/1950 | Clark | |
| 2,677,215 A | 5/1954 | Zalkind | |
| 3,351,268 A | 11/1967 | Schroeder | |
| 3,573,479 A | 4/1971 | Rieth | |
| 4,055,014 A | 10/1977 | Schmidt et al. | |
| 4,299,041 A | 11/1981 | Wilson | |
| 4,409,645 A | 10/1983 | Sloan | |
| 5,387,108 A | 2/1995 | Crowell | |
| 5,577,918 A | 11/1996 | Crowell | |
| 5,789,733 A | 8/1998 | Jachimowicz et al. | |
| 5,918,909 A | 7/1999 | Fiala et al. | |
| 5,927,846 A | 7/1999 | Sinclair | |
| 5,949,215 A | 9/1999 | Takakura | |
| 6,019,284 A | 2/2000 | Freeman et al. | |
| 6,068,183 A | 5/2000 | Freeman et al. | |
| 6,070,990 A | 6/2000 | Dalton et al. | |
| 6,109,762 A | 8/2000 | Hallgrimsson et al. | |
| 6,402,039 B1 | 6/2002 | Freeman et al. | |
| 6,447,143 B2 | 9/2002 | Krietzman et al. | |
| 6,454,435 B1 | 9/2002 | Altman | |
| 6,508,569 B2 | 1/2003 | Krietzman et al. | |
| 6,533,436 B2 | 3/2003 | Krietzman et al. | |

(Continued)

FOREIGN PATENT DOCUMENTS

GB    2277482 A    11/1994

*Primary Examiner*—Karl D. Frech
(74) *Attorney, Agent, or Firm*—Griffiths & Seaton PLLC

(57) ABSTRACT

A transaction product includes an electro-mechanical circuit and an account identifier. The circuit includes a mechanical drive member, a generator in mechanical communication with the drive member, and an electrically driven device in electrical communication with the generator. The circuit is configured such that when a bearer moves the drive member, motion from the drive member is transferred to the generator, the generator uses the motion from the drive member to create an electrical voltage, and the electrical voltage is transferred to the electrically driven device to selectively power activation of the electrically driven device. The account identifier links the transaction product to an account or record and is machine readable by a point-of-sale terminal such that value can be added to or deducted from the account or record using the account identifier. Other cards, products, assemblies and methods of using such cards, products and assemblies are also disclosed.

24 Claims, 12 Drawing Sheets

U.S. PATENT DOCUMENTS

| | | | |
|---|---|---|---|
| 6,543,809 B1 | 4/2003 | Kistner et al. | |
| 6,769,618 B1 | 8/2004 | Finkelstein | |
| 6,817,532 B2 | 11/2004 | Finkelstein | |
| 6,902,116 B2 | 6/2005 | Finkelstein | |
| 6,943,459 B2 | 9/2005 | Hartman et al. | |
| 7,019,492 B1 | 3/2006 | Baker et al. | |
| 7,652,359 B2 * | 1/2010 | Takayama et al. | 257/679 |
| 2002/0143697 A1 | 10/2002 | Gotfried | |
| 2002/0169608 A1 | 11/2002 | Tamir et al. | |
| 2003/0107884 A1 | 6/2003 | Krietzman et al. | |
| 2003/0192209 A1 | 10/2003 | Yeh | |
| 2004/0238625 A1 | 12/2004 | Walker et al. | |
| 2005/0207165 A1 | 9/2005 | Shimizu et al. | |
| 2005/0211785 A1 | 9/2005 | Ferber et al. | |
| 2006/0157555 A1 | 7/2006 | Dean et al. | |
| 2006/0157556 A1 | 7/2006 | Halbur et al. | |
| 2006/0161439 A1 | 7/2006 | Selg et al. | |
| 2009/0293166 A1 * | 12/2009 | Shayne | 2/20 |

* cited by examiner

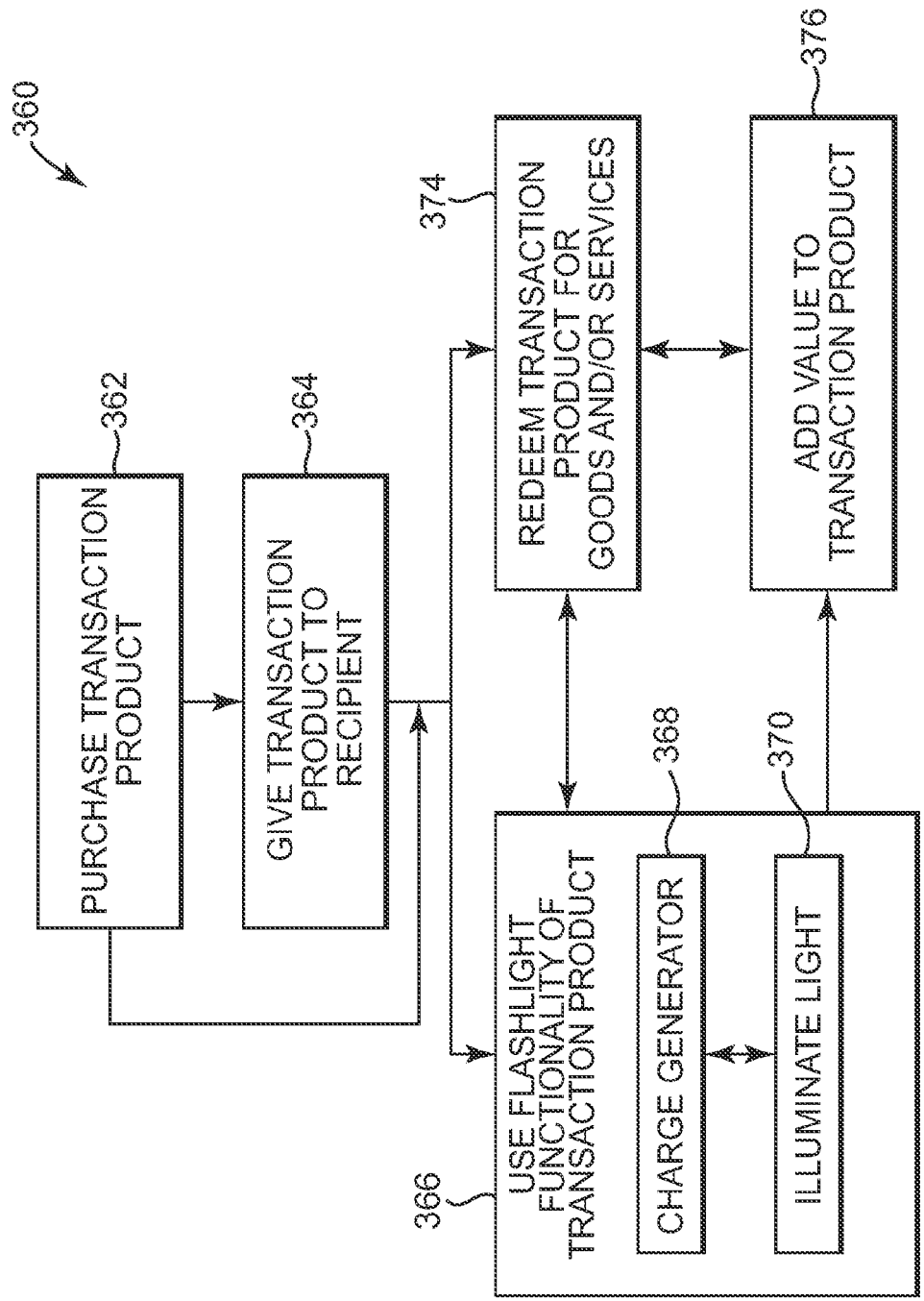

TRANSACTION PRODUCT WITH GENERATOR

BACKGROUND OF THE INVENTION

Stored-value cards and other transaction products come in many forms. A gift card, for example, is a type of stored-value card that includes a pre-loaded or selectively loaded monetary value. In one example, a consumer buys a gift card having a specified value for presentation as a gift to another person. In another example, a consumer is offered a gift card as an incentive to make a purchase. A gift card, like other stored-value cards, can be "recharged" or "reloaded" at the direction of the bearer. The balance associated with the gift card declines as the gift card is used, encouraging repeat visits to the retailer or other provider issuing the gift card. Additionally, the gift card generally remains in the user's purse or wallet, serving as an advertisement or reminder to revisit the associated retailer. Gift cards and other transaction products provide a number of advantages to both the consumer and the retailer.

SUMMARY OF THE INVENTION

One aspect of the present invention relates to a transaction product including an electro-mechanical circuit and an account identifier. The electro-mechanical circuit includes a mechanical drive member, a generator in mechanical communication with the mechanical drive member, and an electrically driven device in electrical communication with the generator. The electro-mechanical circuit is configured such that when a bearer of the transaction product moves the mechanical drive member, motion from the mechanical drive member is transferred to the generator, the generator uses the motion from the mechanical drive member to create an electrical voltage, and the electrical voltage is transferred to the electrically driven device to selectively power activation of the electrically driven device. The account identifier links the transaction product to an account or record and is machine readable by a point-of-sale terminal such that value can be added to or deducted from the account or record using the account identifier. Other related products and methods are also disclosed and provide additional advantages.

BRIEF DESCRIPTION OF THE DRAWINGS

Embodiments of the invention will be described with respect to the figures, in which like reference numerals denote like elements, and in which:

FIG. 15 is a flow chart illustrating a method of using a transaction product, according to one embodiment of the present invention.

DETAILED DESCRIPTION

Figure 1:
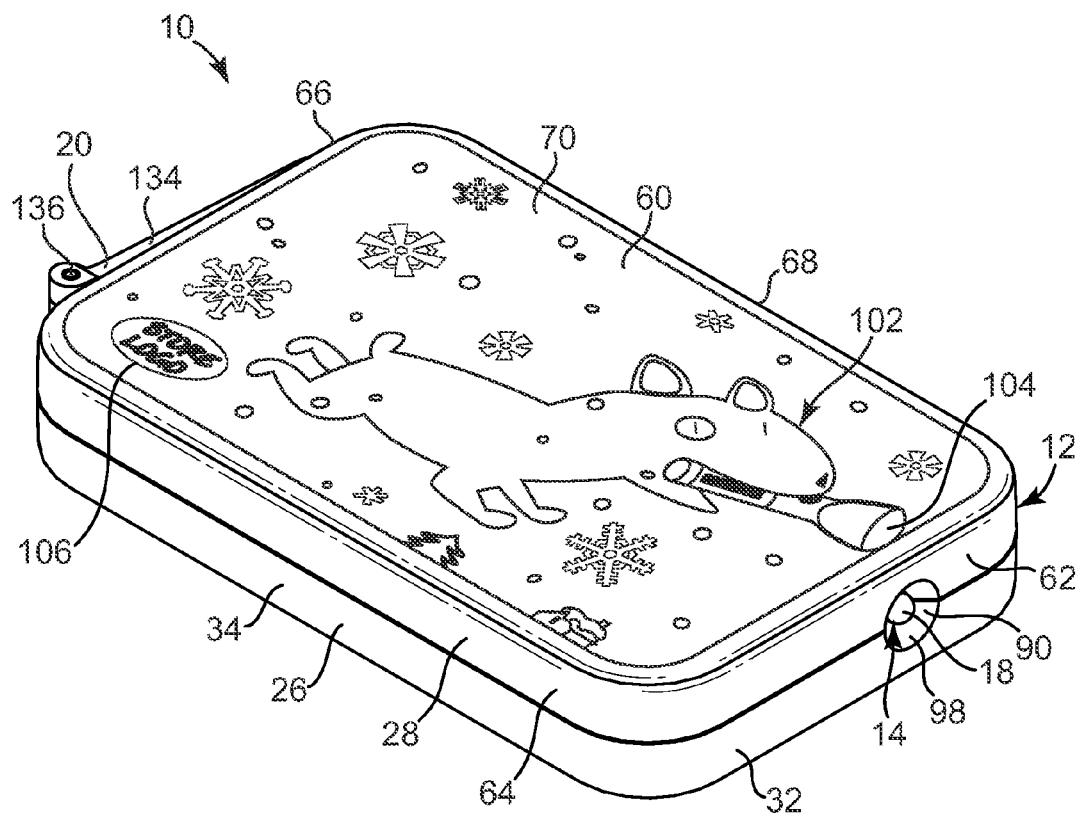
FIG. 1 is a perspective view illustration of a transaction product, according to one embodiment of the present invention.

The following detailed description of the invention is merely exemplary in nature and is not intended to limit the invention or the application and uses of the invention. Furthermore, there is no intention to be bound by any theory presented in the preceding background of the invention or the following detailed description of the invention.

A gift card or other transaction product is adapted for making purchases of goods and/or services from e.g. a retail store or website. According to one embodiment, an original consumer buys the transaction product to give a recipient who in turn is able to use the transaction product at a retail store or setting to pay for goods and/or services. The transaction product, according to embodiments of the present invention, provides the consumer and recipient with extra functionality and amusement in addition to the ability to pay for goods and/or services with the transaction product. In particular, the transaction product presents the original consumer and/or other bearer of the transaction product with a light or other electrically driven device and a built-in generator.

In one example, the transaction product includes a light and a dynamo generator. More specifically, the dynamo generator includes a handle or crank configured to be rotated to wind the generator, which, in turn, causes the generator to produce electricity. The electricity is stored by the light circuit for future use (e.g., to illuminate the light). As such, when a bearer of the transaction product wishes to provide illumination, she simply interacts with a switch on the transaction product, which allows stored electricity to flow to the light thereby illuminating the light. The light remains illuminated until the bearer turns off the light or all of the previously generated and stored electricity is depleted. In order to increase the electricity stored by the light circuit, the bearer simply winds the crank once again to produce additional electricity. As such, a bearer of the transaction product is repeatedly able to use the light without concern for battery replacement or otherwise depleting the means for providing electricity since the transaction product itself is capable of repeatedly generating the electricity necessary to illuminate the light. In one embodiment, the presence of the light and generator as part of the transaction product promotes purchase and/or loading of the transaction product by potential consumers and/or bearers of the transaction product.

Turning to the figures, FIGS. 1-7 illustrate one embodiment of a transaction product 10 such as a stored-value product (e.g., gift card, phone card, etc.), credit product, etc. according to the present invention. Transaction product 10 is configured to be used toward the purchase and/or use of goods and/or services and includes an enclosure or housing 12, a light circuit 14 or other suitable electro-mechanical circuit and a button or switch 16. In one embodiment, light circuit 14 includes a light 18, which is configured to be selectively activated (i.e., illuminated) similarly to a light of a flashlight, and a crank 20 or other mechanical drive member configured to be wound to generate and store additional energy within light circuit 14 for subsequent use to illuminate light 18. In one embodiment, light circuit 14 is substantially enclosed within housing 12. Switch 16 is in communication with light circuit 14 and, in one example, extends at least partially outside of housing 12. Product bearer interaction with switch 16 (e.g., pressing, switching or other suitable movement of switch 16) is configured to turn on and off illumination of light 18 (i.e., to activate and deactivate light 18). In one embodiment, light 18 may be accompanied or replaced by other electrically driven components such as an audio player, video player, fan, etc. as will be apparent to those of skill in the art upon reading the present application. Although substantially described herein as extending through housing 12, upon reading this application, one of ordinary skill in the art will recognize that in other embodiments, light 18 can alternatively extend from housing 12 and/or be viewable through an aperture, filter, etc. of housing 12.

Transaction product 10 further includes an account identifier 22 (FIG. 3) such as a bar code, magnetic strip, a smart chip or other electronic device, a radio frequency identification (RFID) device or other suitable identifier readily machine readable by a point-of-sale terminal or other account access station or kiosk. Account identifier 22 indicates an account or record to which transaction product 10 is linked. The account or record of the monetary or other balance on transaction product 10 optionally is maintained on a database, other electronic or manual record-keeping system or, in the case of "smart" cards for example, on a chip or other electronics or devices on transaction product 10 itself. Accordingly, by scanning account identifier 22, the account or record linked to transaction product 10 is identified and can subsequently be activated, have amounts debited therefrom and/or have amounts added thereto.

In one embodiment, account identifier 22 is printed on an outside surface of housing 12 and includes a character string or code 24 (e.g., a number and or letter string) configured to provide additional security to the use of transaction product 10 and/or configured to be read by a bearer of transaction product 10 to facilitate use of transaction product 10 for web site or other purchases outside of a brick-and-mortar type retail establishment. With the above in mind, account identifier 22 is one example of means for linking transaction product 10 with an account or record, and scanning of account identifier 22 is one example of means for activating or loading value on transaction product 10.

In one embodiment, housing 12 includes a first housing member or base 26 and a second housing member or cover 28. In one embodiment, as described with reference to FIGS. 1 and 4, base 26 generally includes a primary panel 30 and side walls 32, 34, 36 and 38. Primary panel 30 is generally planar and defines an outside surface 40 (e.g., FIG. 3) and an inside surface 42 (FIGS. 8 and 9) opposite outside surface 40. In one embodiment, primary panel 30 is generally rectangular and sized similar to an identification card, a credit card or other card sized to fit in a wallet of a user. In other embodiments, primary panel 30 is otherwise shaped as a square, circle, oval, star or any other suitable shape.

Side walls 32, 34, 36 and 38 each extend from inside surface 42 away from outside surface 40 and collectively extend substantially about the entire perimeter of primary panel 30. In one embodiment, each side wall 32, 34, 36 and 38 extends with a generally perpendicular orientation relative to primary panel 30. In particular, first side wall 32 extends generally parallel to and is positioned opposite third side wall 36. Second side wall 34 and fourth side wall 38 each extend between first side wall 32 and third side wall 36 opposite and generally parallel to one another.

Each side wall 32, 34, 36 and 38 extends from primary panel 30 to collectively define an inside edge 44 opposite primary panel 30. In one example, inside edge 44 is formed as a stepped edge including a first portion 46 and a second portion 48. First portion 46 extends from primary panel 30 a smaller distance than second portion 48 extends from primary panel 30, as illustrated with additional reference to FIGS. 8 and 9. In one example, first portion 46 extends generally about the perimeter of second portion 48. In this respect, inside edge 44 is formed as a stepped edge with the higher, second portion 48 being positioned just inside the lower, first portion 46. In one embodiment, at least first portion 46 forms curved or chamfered corners at the intersection of each side wall 32, 34, 36 and 38 with another of side walls 32, 34, 36 and 38.

In one embodiment, cylindrical protrusions 50 extend from inside surface 42 of primary panel 30 in a direction substantially parallel to side walls 32, 34, 36 and 38. In one example, each cylindrical protrusion 50 is at least partially hollow so as to receive a corresponding feature of cover 28 and a coupling device 52 (FIGS. 3 and 8), as will be further described below, to facilitate alignment and coupling of base 26 with cover 28. Other features configured to facilitate alignment and coupling of base 26 and cover 28 are also contemplated. In one example, base 26 includes a plurality of internal features 54 configured to facilitate placement and support of components of light circuit 14 within base 26, as will also be further described below.

In one embodiment, cover 28 generally includes a primary panel 60 and side walls 62, 64, 66 and 68. Primary panel 60 is generally planar and defines an outside surface 70 and an inside surface 72 (FIG. 10) opposite outside surface 70. In one embodiment, primary panel 60 is generally sized similar to primary panel 30 of base 26. Side walls 62, 64, 66 and 68 each extend from inside surface 72 and collectively extend generally about the entire perimeter of primary panel 60. For example, each of side walls 62, 64, 66 and 68 extends with a generally perpendicular orientation relative to primary panel 60. In particular, first side wall 62 is positioned opposite and generally parallel to third side wall 66. Second side wall 64 and fourth side wall 68 extend between first side wall 62 and third side wall 66 opposite and generally parallel to one another.

Figure 10:
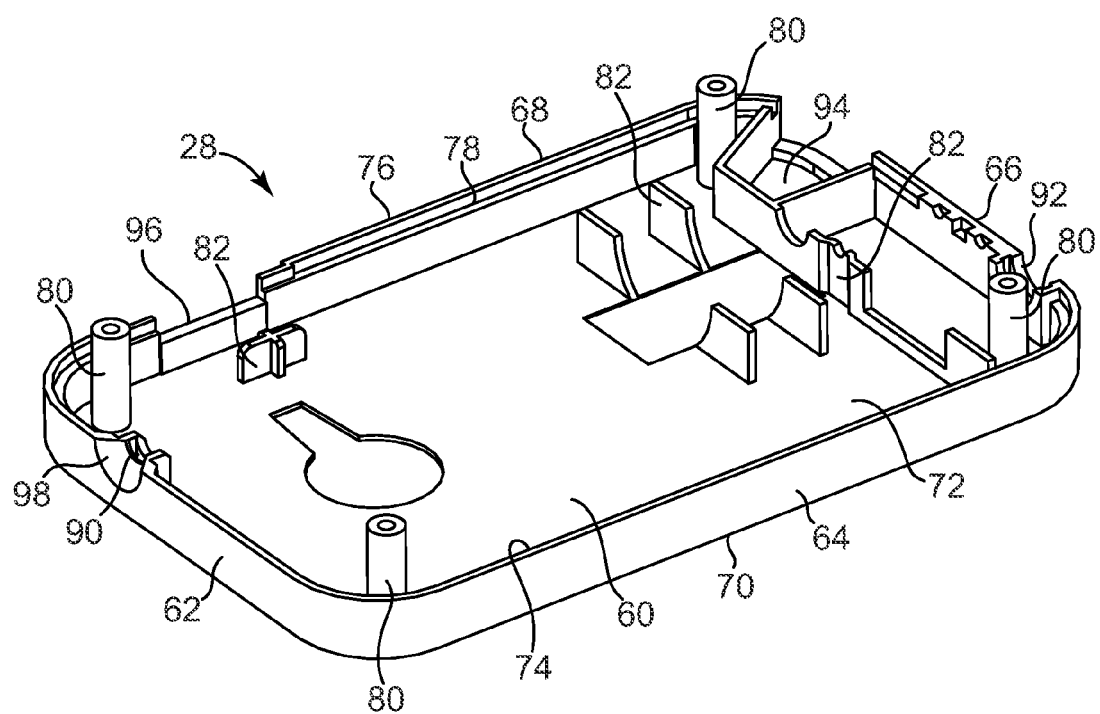
FIG. 10 is an inside perspective view illustration of a cover of the transaction product of FIG. 1, according to one embodiment of the present invention.

Each side wall 62, 64, 66 and 68 extends from primary panel 60 to collectively form an inside edge 74 (FIGS. 8 and 10) opposite primary panel 60. In one embodiment, inside edge 74 is a stepped edge including a first portion 76 and a second portion 78 (FIG. 10). In one embodiment, first portion 76 extends from primary panel 60 a further distance than second portion 78 extends from primary panel 60. First portion 76 extends around the perimeter of second portion 78. In this respect, inside edge 74 is formed as a stepped edge with lower, second portion 78 being positioned just inside higher, first portion 76. In one embodiment, the corners of inside edge 74 formed at the intersections of side walls 62, 64, 66 and 68 with another of side walls 62, 64, 66 and 68 are rounded or chamfered.

Referring to FIG. 10, in one example, cover 28 includes a plurality of protrusions 80 (e.g., cylindrical protrusions) extending from inside surface 72 parallel to side walls 62, 64, 66 and 68. Each of the plurality of protrusions 80 are positioned on cover 28 to generally align with and fit at least partially within cylindrical protrusions 50 of base 26 (FIG. 1) upon assembly of housing 12 to facilitate alignment and coupling of base 26 with cover 28. In one embodiment, each of a plurality of internal features 82 extends from inside surface 72 or are otherwise included within cover 28 to facilitate placement, alignment and coupling of cover 28 with respect to components of light circuit 14 as will be further described below.

In one embodiment, each of base 26 and cover 28 is formed by injection molding of plastic (e.g., polycarbonate, polystyrene, polyvinyl chloride (PVC), acrylonitrile butadiene styrene (ABS), polyethylene terephthalate (PET), teslin, polyactide (PLA) and acrylic) or other suitable material to define the various attributes of base 26 and cover 28. Other methods of forming base 26 and cover 28 are also contemplated.

In one example, housing 12 is assembled by placing cover 28 on base 26 or vice versa to form a chamber 84 (e.g., FIG. 8) therebetween. Accordingly, cover 28 is placed on base 26 such that inside edge 44 of base 26 interfaces with inside edge 74 of cover 28. More specifically, first portion 46 and second portion 48 of inside edge 44 interface with first portion 76 and second portion 78 of inside edge 74, respectively. The stepped interface provides for a stable and generally neat coupling of base 26 and cover 28. In one example, adhesive is applied between inside edge 44 and inside edge 74 to secure base 26 to cover 28 and/or cover 28 is ultrasonically welded or otherwise coupled with base 26 along inside edges 44 and 74. In one embodiment, upon coupling of base 26 with cover 28, cylindrical protrusions 50 of base 26 each receive one of the plurality of protrusions 80 (FIG. 10) of cover 28, and one of coupling devices 52 (FIGS. 1 and 3), such as a screw, rivet, etc., is inserted into hollow cylindrical protrusions 50 from outside surface 70 of base 26 and into a corresponding one of the plurality of protrusions 80 to secure base 26 to cover 28. Other methods of securing base 26 to cover 28 are also contemplated.

In one embodiment, upon assembly, housing 12 defines one or more of a light aperture 90, a crank connection aperture 92, a crank storage recess 94 and a switch reception aperture 96. In one example, one or more of light aperture 90, crank connection aperture 92, crank storage recess 94 and switch reception aperture 96 are each partially formed by each of base 26 and cover 28, more specifically, by side walls 32, 34, 36 and 38 of base 26 and side walls 62, 64, 66 and 68 of cover 28. In one embodiment, light aperture 90 is collectively defined by each of first side walls 32 and 62, and light aperture 90 extends from an external surface of housing 12 into chamber 84. Light aperture 90 is sized and shaped to receive light 18 of light circuit 14. In one embodiment, an outermost portion 98 of light aperture 90 tapers outwardly in a conical manner.

In one embodiment, both of crank connection aperture 92 and crank storage recess 94 are collectively defined by third side walls 36 and 66 of base 26 and cover 28. While crank connection aperture 92 extends from an external surface of housing 12 into chamber 84, in one embodiment, crank storage recess 94 is indented toward first side walls 32 and 62, but is not open to chamber 84 to prevent contaminates from entering chamber 84 via crank storage recess 94. In one example, crank connection aperture 92 is spaced from crank storage recess 94 along side walls 36 and 66, and, in one embodiment, crank connection aperture 92 is positioned nearer second side walls 34 and 64 than crank storage recess 94. Crank 20 extends at least partially outside housing 12 and is coupled to a remainder of light circuit 14 through crank connection aperture 92. As will be further described below, a portion of crank 20 is positioned in crank storage recess 94 when crank 20 is in a storage position. Switch 16 extends at least partially outside of housing 12, and in one embodiment, is coupled to remainder of light circuit 14 through switch reception aperture 96 of housing 12 as will also be further described below.

Figure 3:
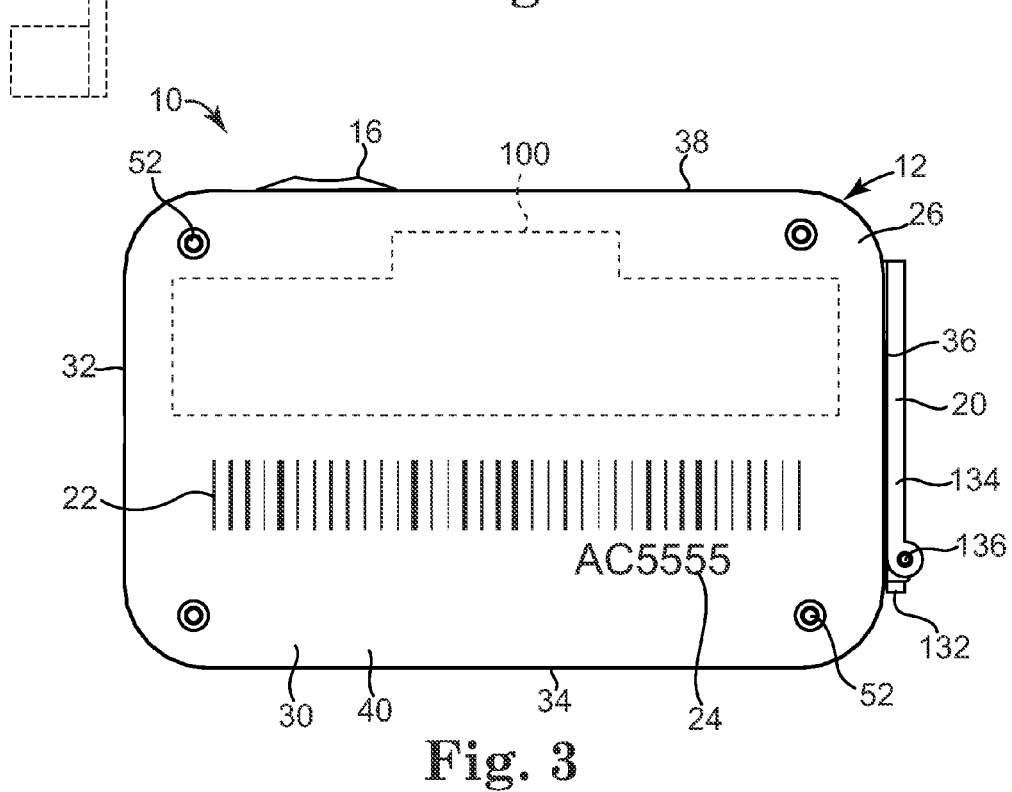
FIG. 3 is a rear view illustration of the transaction product of FIG. 1.
Figure 4:
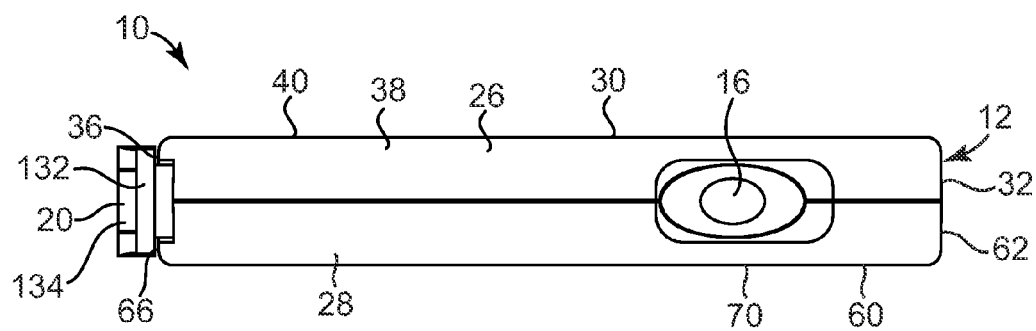
FIG. 4 is a top view illustration of the transaction product of FIG. 1.
Figure 5:
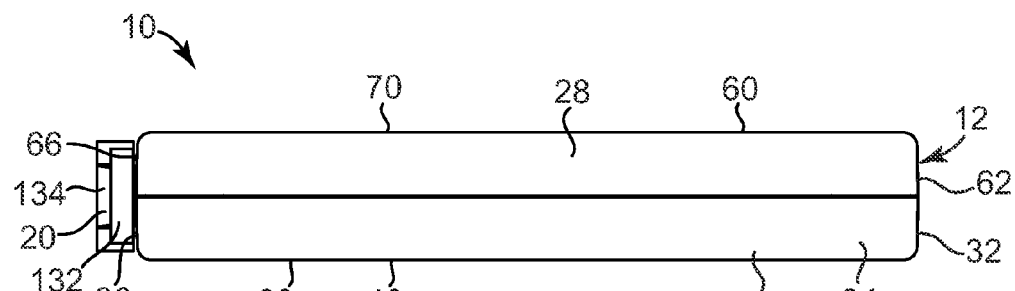
FIG. 5 is a bottom view illustration of the transaction product of FIG. 1.
Figure 6:
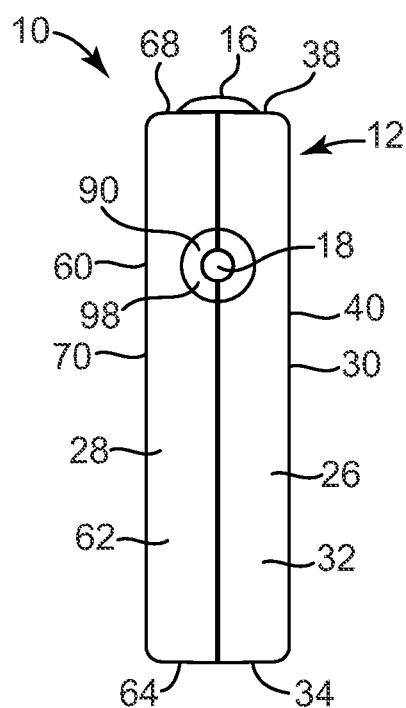
FIG. 6 is a right side view illustration of the transaction product of FIG. 1.
Figure 7:
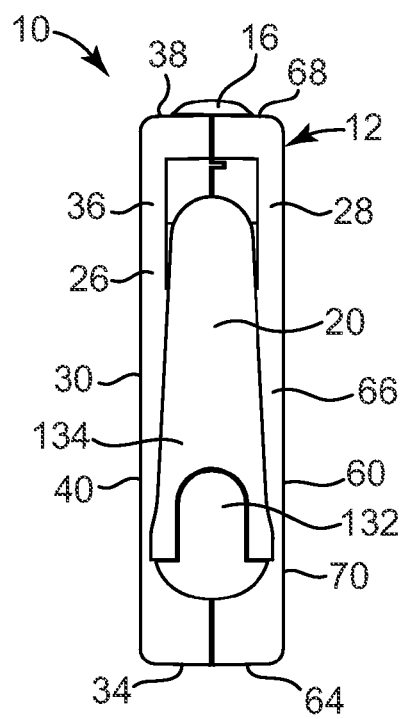
FIG. 7 is a left side view illustration of the transaction product of FIG. 1.

In one embodiment, redemption indicia, which are generally indicated by the dashed box 100 in FIG. 3, are included on housing 12, for example, on outside surface 40 of base 26. Redemption indicia 100 indicate that transaction product 10 is redeemable for the purchase of goods and/or services and that, upon use, a value of the purchased goods and/or services will be deducted from the financial account or record linked to transaction product 10. In one embodiment, redemption indicia 100 include phrases such as "<NAME OF STORE>GiftCard" and "This GiftCard is redeemable for merchandise or services at any of our stores or at our web site," and/or provides help or phone line information in case of a lost, stolen or damaged stored-value card, etc. In one embodiment, redemption indicia 100 are additionally or alternatively included on cover 28 of housing 12.

In one embodiment, housing 12, such as one or both of outside surfaces 40 and 70, include decorative indicia 102 relating to a particular occasion, such as a wedding, new baby, graduation, holiday, season, brand identifier, media format identifier or other visual design to promote purchase of transaction product 10. In one particular embodiment, decorative indicia 102 include a picture or a graphic representing a fictional and/or non-fictional character configured to correspond with and or promote inclusion of light 18 in transaction product 10. In one example, a portion 104 of decorative indicia 102 that is generally associated with illumination or glow is positioned on housing 12 to at least partially visually align with the position of actual light 18. As such, illumination of light 18 generally appears to come from or to otherwise be associated with portion 104 of decorative indicia 102.

Housing may additionally or alternatively include brand indicia 106, which identify a brand associated with transaction product 10 such as identifying a product brand, a store brand, department, etc. Other combinations or selections of indicia to be included on housing 12 are also contemplated. In one embodiment, indicia 100, 102, 104, etc. are one of printed to and/or printed to a label or sticker applied to one or both of outside surfaces 40 and 70.

Figure 8:
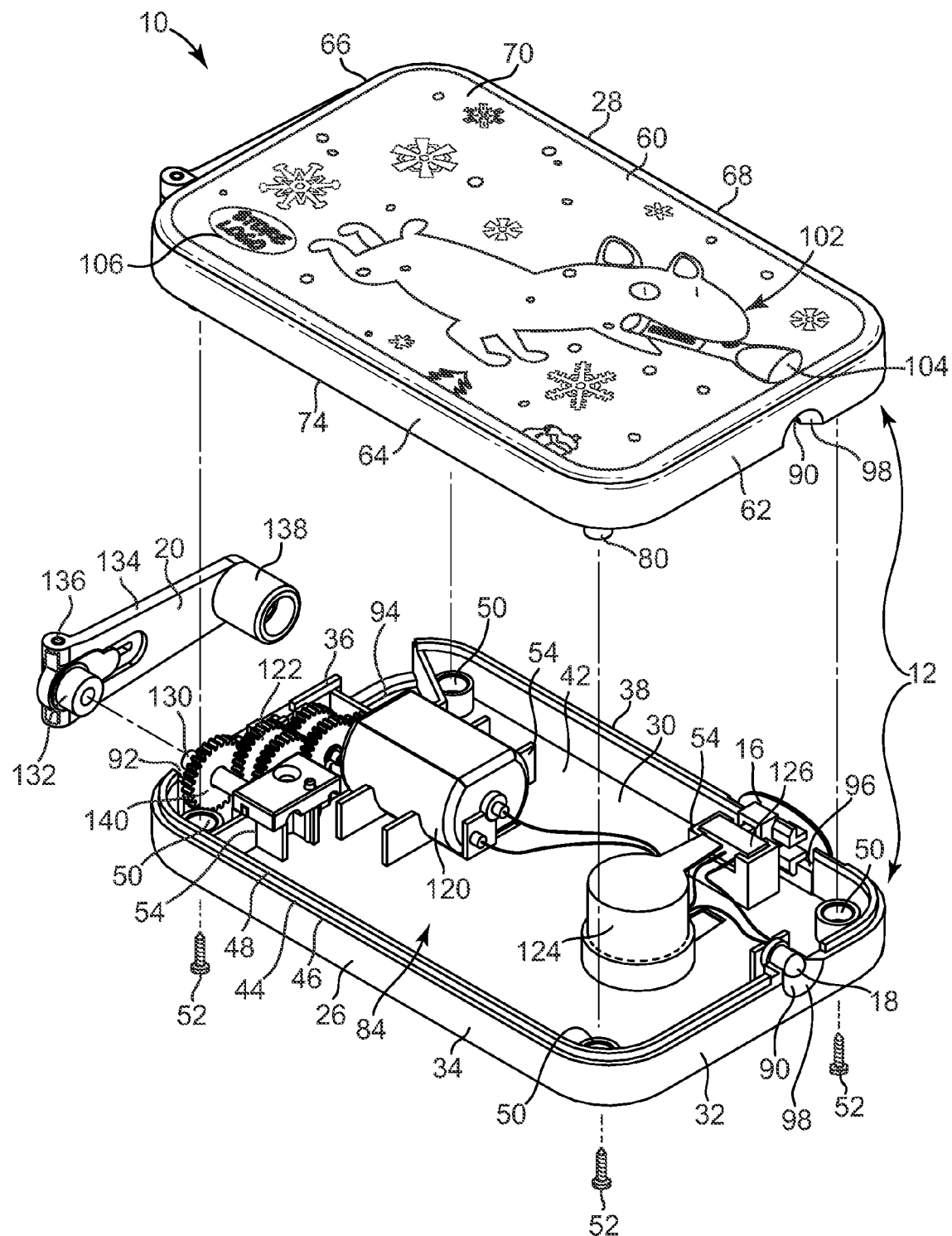
FIG. 8 is an exploded perspective view illustration of the transaction product of FIG. 1, according to one embodiment of the present invention.
Figure 9:
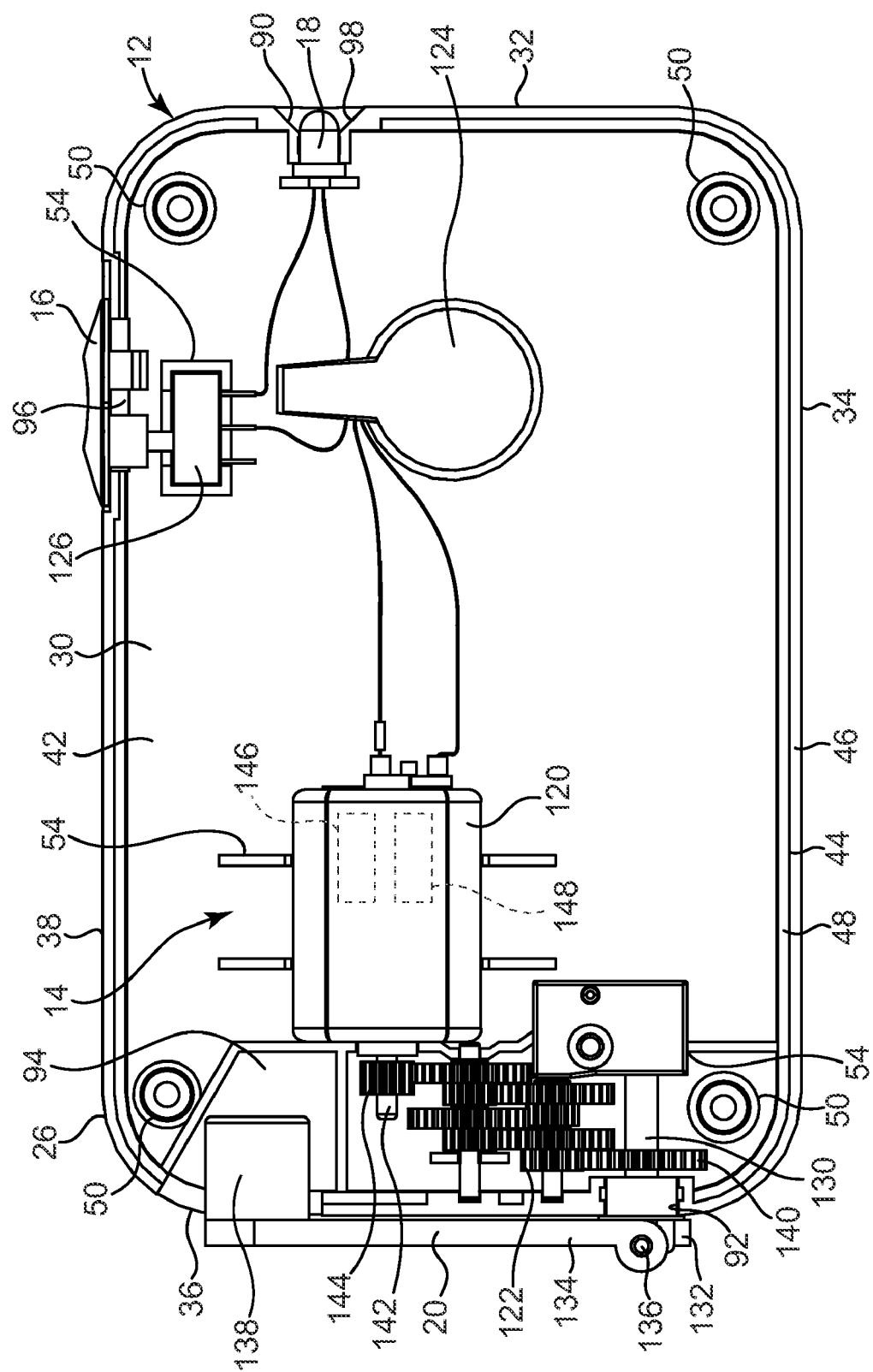
FIG. 9 is a top view illustration of a base and a light circuit of the transaction product of FIG. 1, according to one embodiment of the present invention.

Referring primarily to FIGS. 8 and 9, in one example, light circuit 14 is substantially enclosed within housing 12, more specifically, within chamber 84. In one embodiment, light circuit 14 includes both mechanical components to provide a dynamic drive to a generator 120 (e.g., a dynamo generator), which is configured to convert the dynamic or mechanical movement into electrical energy. More specifically, light circuit 14 includes crank 20 or other mechanical drive mechanism, a plurality of gears 122, generator 120, a capacitor 124, light 18 and a switch mechanism 126.

Crank 20 extends from housing 12 and is configured to be rotated by a user in one of either a clockwise or counterclockwise fashion about an axle 130, which is coupled to housing 12. Crank 20 may take any of a variety of forms as will be apparent to those of skill in the art upon reading the present application. Although primarily described herein as being wind-up or rotatable to provide rotatable movement to generator 120, in other embodiments, linear or other movement may be provided by crank 20. In the embodiment illustrated in FIGS. 1-9, crank 20 includes a first member 132 and a second member 134. First member 132 is rigidly coupled with axle 130 such that when first member 132 rotates, axle 130 also rotates.

Second member 134 is pivotably coupled with first member 132, for example, about a pivot point such as pin connection 136. The pivotable coupling allows second member 134 to rotate between the storage position (FIGS. 1-9) and an operable position generally indicated in dashed lines in FIG. 2. More specifically, second member 134 includes a protrusion 138 at an end opposite pin connection 136. In one embodiment, protrusion 138 is cylindrical and is configured to rotate relative to its connection with a remainder of second member 134.

When second member 134 is in the storage position, second member 134 extends generally adjacent and parallel third side walls 36 and 66 of base 26 and cover 28, and protrusion 138 nests within crank storage recess 94. When so positioned, crank 20 is generally prevented from inadvertently moving or, more specifically, rotating about axle 130. When a bearer of transaction product 10 wishes to wind crank 20 to produce electrical voltage or other form of electricity, crank 20 is pivoted about pin connection 136 approximately 180°, although any other suitable amount of pivoting is also acceptable, to the operable position.

Figure 2:
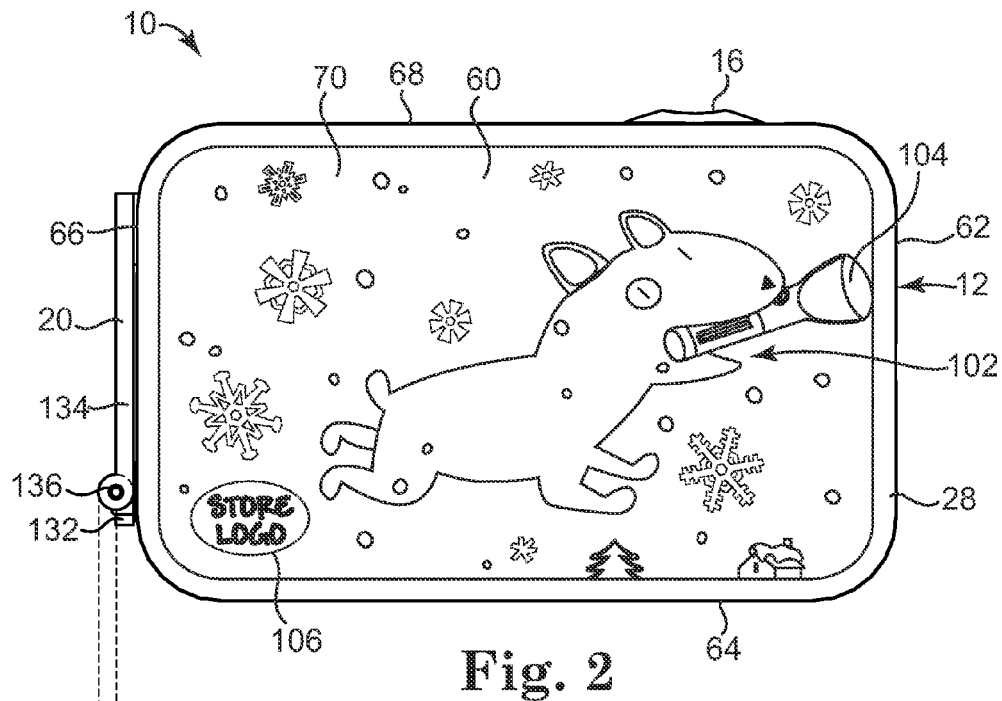
FIG. 2 is a front view illustration of the transaction product of FIG. 1.

Referring to the dashed lines of FIG. 2, while in the operable position, protrusion 138 extends away from the remainder of transaction product 10 such that protrusion 138 may be readily grasped by the bearer to facilitate winding of crank 20. In one embodiment, protrusion 138 is rotatable relative to the remainder of second member 134, such that the bearer can rotate crank 20 any number of rotations while grasping protrusion 138 without having to adjust her grasp on protrusion 138 (FIGS. 8 and 9), even where housing 12 remains stationary during winding. When the bearer has finished winding, at least for the time being, second member 134 of crank 20 easily pivots back to the storage position until future windings. In view of the above, crank 20 is one example of means for introducing mechanical movement to transaction product 10.

In one embodiment, a crank gear 140 is positioned around and securely coupled to axle 130 such that when axle 130 rotates with crank 20, so does crank gear 140. Crank gear 140 is positioned to interface with the plurality of gears 122 in a manner transferring rotational forces from crank 20 to generator 120. In one embodiment, as shown in FIG. 9, generator 120 includes a pin 142 extending therefrom and a generator gear 144 coupled with pin 142 and positioned to interact with the plurality of gears 122 opposite crank gear 140. As such, rotation of the plurality of gears 122 is transferred to crank gear 140 and therefore, to generator 120 via axle 130. Accordingly, the plurality of gears 122 is an example of means for transferring mechanical movement between crank 20 and generator 120.

Generator 120 is in mechanical communication with crank 20 via the plurality of gears 122 and is any suitable generator (e.g., a dynamo generator) configured to receive the mechanical motion from pin 142 and to convert or otherwise use such motion to create an alternating current (AC) voltage. As such, generator 120 is one example of means for receiving mechanical movement and using such mechanical movement to create electricity. In one embodiment, generator 120 includes or is otherwise coupled to a bridge rectifier (generally indicated by a dashed box 146 in FIG. 9) that converts the AC voltage of the generator 120 into a direct current (DC) voltage. In one embodiment, generator 120 further includes or is otherwise coupled to a voltage regulator, which is generally indicated by a dashed box 148 in FIG. 9. Voltage regulator 148 limits the voltage output from generator 120 to prevent or at least decrease the chance that capacitor 124 is overloaded with the generated voltage, which could be detrimental to further functioning of capacitor 124.

Capacitor 124 is in electrical communication with generator 120 or to voltage regulator 148 if voltage regulator is included separate from generator 120. Capacitor 124 receives generated voltage from generator 120 directly or through voltage regulator 148 and stores the voltage for instantaneous and/or future use. Capacitor 124 as referred to herein refers to any capacitor, group of capacitors, or other device capable of storing voltage and creating a desired capacitance. As such, capacitor 124 is one example of means for storing electrical voltage for future use to drive or power light 18. The capacitor 124 is in electrical communication with light 18 such that the voltage stored by capacitor 124 can selectively be used to power activation, which, in this case, is illumination, of light 18.

Light 18 as used herein refers to any suitable light source or plurality of light sources configured to be illuminated. In one embodiment, light 18 is a single or multiple super bright white light emitting diodes (LEDs), each of which, in one example, is rated for a life of at least 10,000 hours. In view of the above, light 18 is one example of means for emitting light from housing 12. Other suitable lights 18 or electrically powered devices will be apparent to those of skill in the art upon reading the present application.

In one embodiment, switch mechanism 126 is in electrical communication with at least capacitor 124 and, in one embodiment, with light 18. Switch mechanism 126 is configured to selectively prevent and allow electrical flow from capacitor 124 to light 18. More specifically, light 18 is illuminated (i.e., is on) when electrical flow from capacitor 124 to light 18 is allowed and is not illuminated (i.e., is off) when electrical flow from capacitor 124 to light 18 is prevented. In one example, switch mechanism 126 is fully enclosed within housing 12 and is coupled with switch 16 extending therefrom. Since switch 16 is accessible from an external portion of housing 12 (i.e., the portion shown in FIGS. 1-7), a bearer of transaction product 10 can easily access switch 16 to slide or otherwise interact with and move switch 16 between an on position and an off position. Movement of switch 16 between the on and off positions causes switch mechanism 126 to selectively start and stop flow of electrical voltage to light 18 from capacitor 124. In this manner, the bearer has control over when light 18 of transaction product 10 is illuminated and when light 18 is not illuminated. In view of the above, switch 16 is one example of means for starting and stopping flow of electrical voltage between capacitor 124 and light 18.

As illustrated with reference to FIGS. 8 and 9, during assembly, light circuit 14 is positioned substantially within chamber 84 of housing. More specifically, in one embodiment, light circuit 14 is positioned substantially within base 26. In particular, generator 120 is placed inside base 26, for example, between two or more internal features 54, the plurality of gears 122 are positioned near third side wall 36 such that one end of the plurality of gears 122 interfaces with generator gear 144. Axle 130 of crank 20 is positioned to extend through a portion of crank connection aperture 92 formed by base 26 such that crank gear 140 interfaces with the plurality of gears 122 opposite generator gear 144. Crank 20 is coupled to axle 130 and initially placed in the storage position such that protrusion 138 of crank 20 nests within crank storage recess 94.

Switch mechanism 126 is positioned inside base 26, for example, with the help of one or more internal features 54. Switch 16 is slidably positioned within a portion of switch reception aperture 96 formed by base 26 such that switch 16 interfaces with switch mechanism 126 as will be apparent to those of skill in the art upon reading this application. Capacitor 124 is positioned within base 26 and is spaced from but electrically coupled to each of switch mechanism 126 and generator 120. In one embodiment, capacitor 124 is positioned relative to base 26 with the help of one or more internal features 54 of base 26. Light 18 is placed to nest at least partially within light aperture 90 and is electrically coupled to one or both of capacitor 124 and switch mechanism 126 depending upon the exact electrical arrangement as will be apparent to those of skill in the art upon reading the present application. As such, light 18 is in electrical communication with generator 120, for example, via capacitor 124. In one embodiment, light 18 is directed toward the outside of housing 12 such that light 18 will illuminate areas outside of housing 12. In one embodiment, the tapered nature of outermost portion 98 of light aperture 90 facilitates wider distribution of illumination from light 18 while still maintaining light 18 fully between side walls 32 and 62 to prevent or at least decrease the chance of inadvertently breaking light 18.

Once light circuit 14 is properly positioned, base 26 is placed on cover 28 or vice versa. Accordingly, base 26 is placed on cover 28 such that internal features 82 of cover 28 are aligned with corresponding components of light circuit 14 and, in one embodiment, to align portions of light aperture 90, crank connection aperture 92, crank storage recess 94 and switch reception aperture 96 formed by cover 28 with the corresponding portions formed by base 26. Upon coupling, inside edge 44 of base 26 interfaces with inside edge 74 of cover 28. More specifically, first portion 46 and second portion 48 of inside edge 44 respectively interface with first portion 76 and second portion 78 of inside edge 74.

In one example, adhesive is applied between inside edge 44 and inside edge 74 to secure base 26 to cover 28 and/or cover 28 is ultrasonically welded or otherwise coupled with base 26 along inside edges 44 and 74. In one embodiment, upon coupling of base 26 with cover 28, cylindrical protrusions 50 of base 26 each receive one of the plurality of protrusions 80 (FIG. 9) of cover 28 and a coupling device 52. Other methods of securing base 26 to cover 28 are also contemplated. In view of the above, housing 12 is one example of substantially enclosing portions of light circuit 14 such as generator 120 and capacitor 124. Upon reading this application, one of ordinary skill in the art will recognize that in other embodiments, base 26 or other suitable member may function as a support member for light circuit 14 (or other electro-mechanical circuit) and cover 28 may be eliminated. As such, in one embodiment, additional portions of light circuit 14 may be exposed to the environment.

Figure 11:
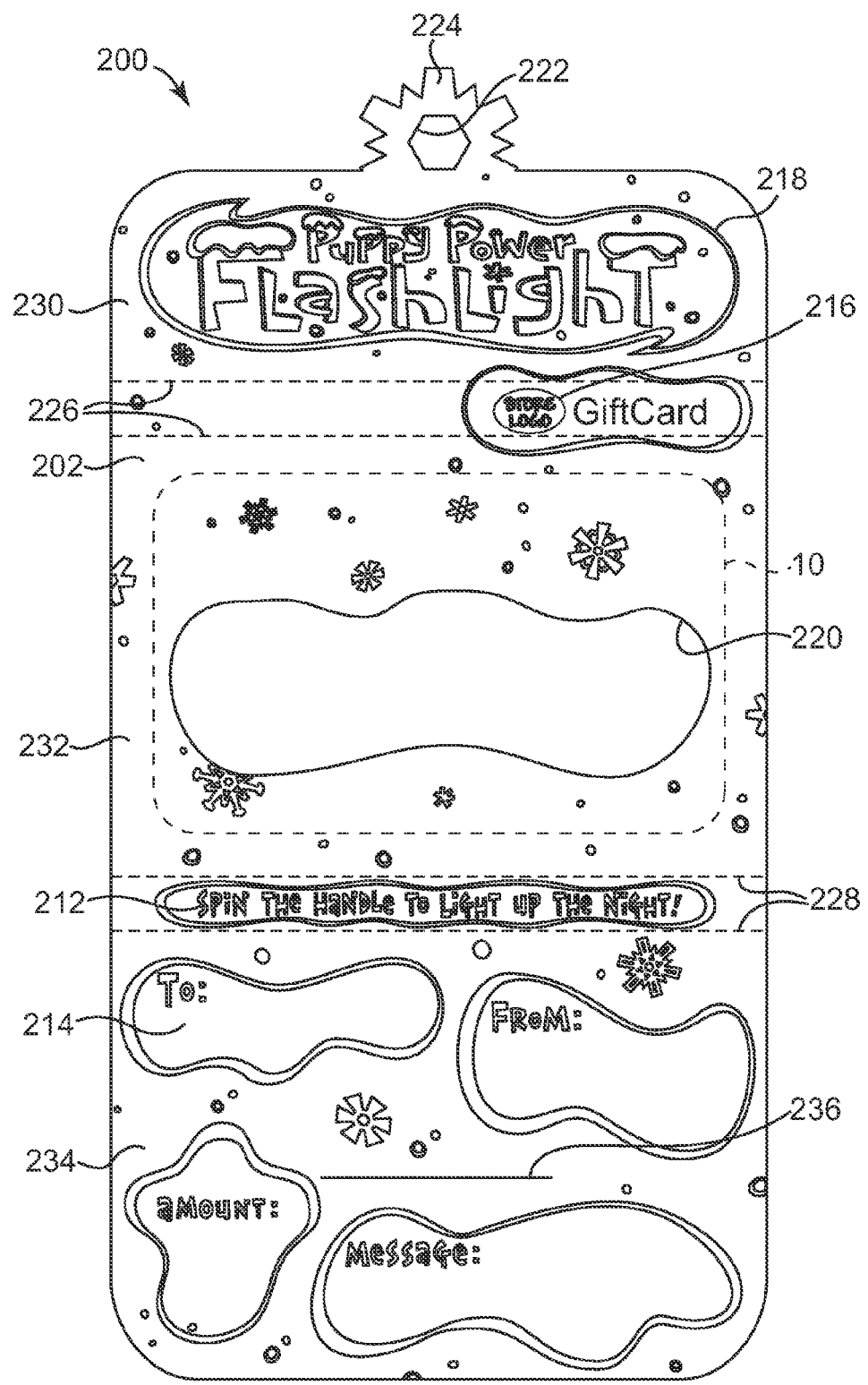
FIG. 11 is a front view illustration of an unfolded carrier for a transaction product, according to one embodiment of the present invention.
Figure 12:
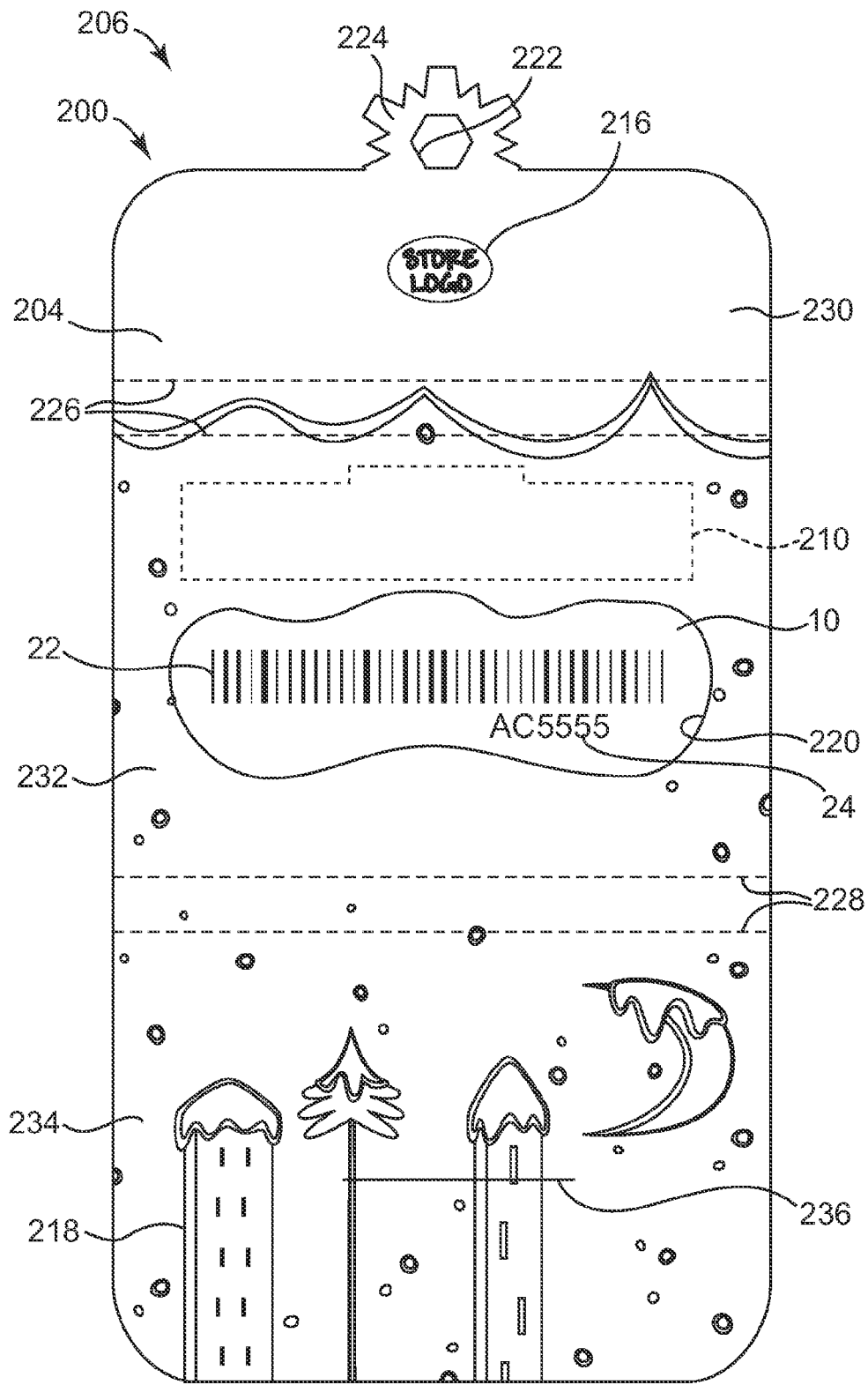
FIG. 12 is a back view illustration of a transaction product assembly including the unfolded carrier of FIG. 11 with the transaction product of FIG. 1.

FIGS. 11 and 12 illustrate a carrier or backer 200 supporting transaction product 10 (FIGS. 1-7). Backer 200 comprises a single layer or multiple layers of paper or plastic material, for example, generally in the form of a relatively stiff but bendable/flexible card. Use of other materials is also contemplated. As such, backer 200 defines a first or front surface 202 (FIG. 11) and a second or rear surface 204 (FIG. 12). Transaction product 10, which is generally represented in phantom lines in FIG. 11 for illustrative purposes (e.g., to allow for full viewing of front surface 202), is readily releasably attached to backer 200, for example, by adhesive, blister packaging, overlying skinning material, clam shell packaging or the like, such that transaction product 10 with backer 200 collectively define a transaction product assembly 206.

Backer 200 displays indicia, graphics or text information including store logo(s), store name(s), slogans, advertising, instructions, directions, brand indicia, promotional information, holiday indicia, seasonal indicia, media format identifiers, characters and/or other information. The various indicia may be included on one or more of front and rear surfaces 202 and 204. In one example, the indicia include one or more of redemption indicia 210, instructional indicia 212, message field indicia 214, brand indicia 216, decorative indicia 218, etc.

Redemption indicia 210, which are generally indicated with a dashed box in FIG. 12, indicate that transaction product 10 is redeemable for the purchase of goods and/or services and that upon use, a value of the purchased goods and/or services will be deducted from the financial account or record linked to transaction product 10. In one embodiment, redemption indicia 210 include phrases such as "<NAME OF STORE>GiftCard" and "This GiftCard is redeemable for merchandise or services at any of our stores or at our website," and/or provides help (e.g., balance information) or phone line information in case of a lost, stolen or damaged transaction product 10, etc.

Instructional indicia 212 include any indicia generally referring to how transaction product 10 can be used for purposes other than value redemption. For example, indicia 212 may instruct the bearer to "spin the handle to light up the night" or otherwise instruct that spinning crank 20 will "charge" transaction product 10 with electrical voltage, and that interaction with switch 16 will cause light 18 to be illuminated when available electrical voltage is stored to transaction product 10. Other instructional indicia 212 are also contemplated.

Message field indicia 214, for example, include "to," "from" and "amount" fields that are configured to be written to by the bearer of transaction product assembly 206 prior to presenting transaction product assembly 206 to a recipient. As such, message field indicia 214 facilitate the consumer in preparing transaction product assembly 206 for gifting to a recipient.

Brand indicia 216 identify a store, brand, department, etc. and/or services associated with transaction product 10. Any decorative indicia 218, which may be similar to or coordinate with indicia of transaction product 10, may also be included on backer 200. Any of indicia 210, 212, 214, 216, 218 or other indicia optionally may appear anywhere on backer 200 or transaction product 10. In one embodiment, at least one of indicia 210, 212, 214, 216, 218 or other indicia include stylized text further contributing to the aesthetics of transaction product assembly 206 as illustrated, for example, in FIGS. 11 and 12. Additional information besides that specifically described and illustrated herein may also be included.

In one embodiment, backer 200 includes a window or opening 220 for displaying account identifier 22 of transaction product 10 as illustrated in FIG. 12. As previously described, account identifier 22 is adapted for accessing an account or record associated with transaction product 10 for activating, loading or debiting value from the account or record. Accordingly, in one embodiment, opening 220 allows access to account identifier 22 to activate and/or load transaction product 10 without removing transaction product 10 from backer 200.

In one embodiment, backer 200 defines a hanging aperture 222 configured to receive a support arm or hook, such that transaction product assembly 206 can be hung from a rail or rack within the retail setting or elsewhere to facilitate display of transaction product assembly 206. According to one embodiment, FIG. 12 illustrates surfaces of backer 200 that will be supported on a rack or other fixture while FIG. 11 illustrates surfaces of backer 200 that will be visible to a consumer of a retail store who is considering the purchase of transaction product assembly 206.

In one embodiment, hanging aperture 222 is formed in the middle of a tab 224, and fold lines 226 and 228 are defined to extend laterally across backer 200 spaced from one another. More specifically, fold lines 226 are positioned relatively near tab 224 as compared to fold lines 228. A first panel 230, an intermediate or second panel 232 and a third panel 234 are defined by backer 200 and separated by the position of fold lines 226 and 228. First panel 230 extends from fold lines 226 away from fold lines 228 and includes tab 224. Second panel 232 extends between fold lines 226 and 228. Third panel extends from fold lines 226 in a direction opposite fold lines 228. In one embodiment, a laterally extending slit 236 is laterally centered on third panel 234.

First surface 202 of second panel 232 is configure to receive transaction product 10, and backer 200 is configured to be folded about fold lines 226 and 228 to wrap or substantially enclose transaction product 10 therebetween, which is particularly useful when transaction product assembly 206 is to be offered to a recipient other than the original consumer. In one example, upon folding backer 200, tab 224 is received by slit 236 to maintain backer 200 in the folded position until it is desired to unfold backer 200 to view or otherwise access transaction product 10. Use of any other suitable backers, for example, non-folding backers for supporting transaction product 10 are also contemplated.

Figure 13:
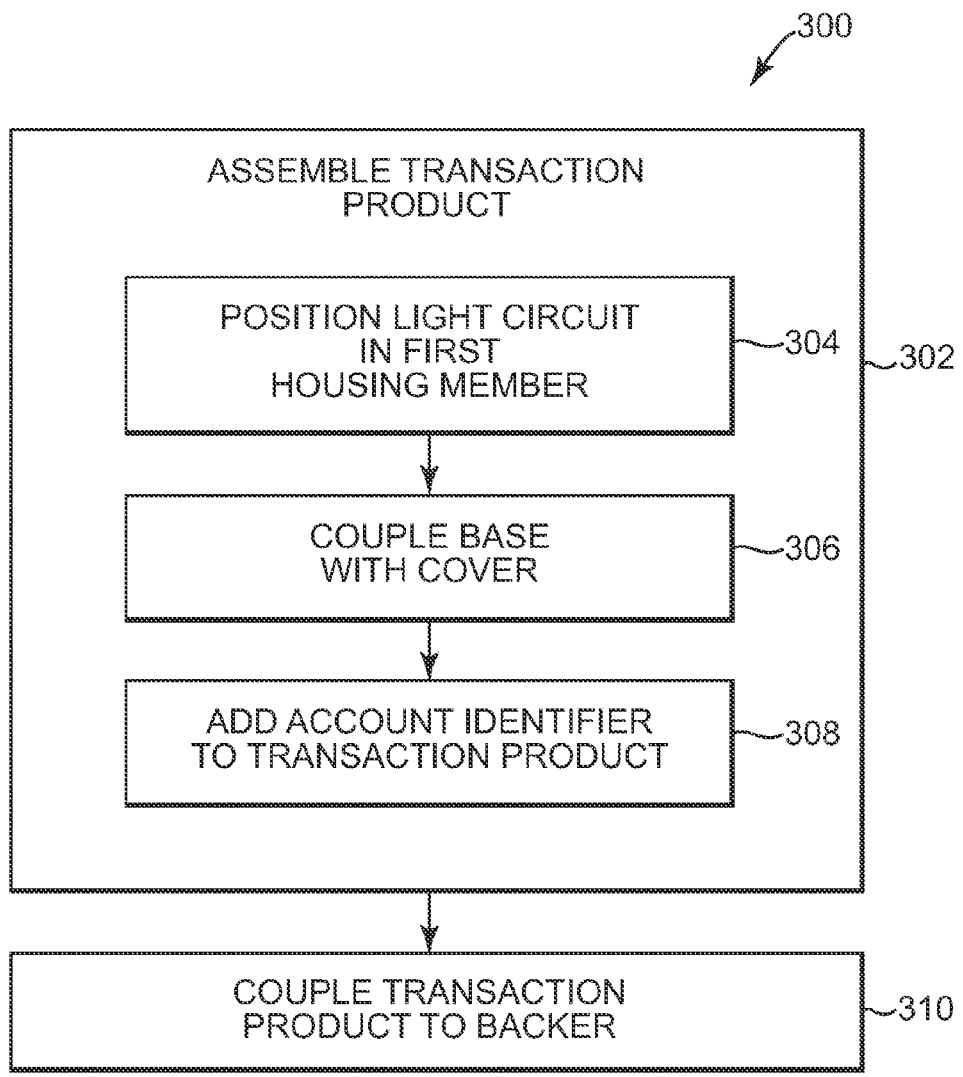
FIG. 13 is a flow chart illustrating a method of assembling a transaction product, according to one embodiment of the invention.

FIG. 13 is a flow chart illustrating one embodiment of a method 300 of assembling transaction product 10. For example, at 304, light circuit 14 is positioned in housing 12, for instance, is coupled with base 26 such that light 18, axle 130 and switch 16 are respectively positioned to extend through portions of light aperture 90, crank connection aperture 92 and switch reception aperture 96 defined by base 26. In one embodiment, components of light circuit 14 are easily aligned and positioned relative to base 26 using internal features 54 of base 26 as a guide. Once light circuit 14 with switch 16 and crank 20 are in place, then, at 306, base 26 and cover 28 are coupled to one another. In one example, inside edge 44 of base 26 is positioned to abut and to be secured to inside edge 74 of cover 28 as described above. Other methods of coupling base 26 and cover 28 are also contemplated as are alternative housings 12 that may not include base 26 and/or cover 28.

At 308, account identifier 22 is added to housing 12. Although pictured in FIG. 13 as occurring after operations 304 and 306, it should be understood that account identifier 22 may be applied to housing 12 or any portion thereof at any suitable time during manufacturing and assembly thereof. For example, account identifier 22 may be molded into or otherwise integrally formed as part of housing 12, may be enclosed within housing 12 and/or may be printed or otherwise applied to housing 12 before or after one or more of operations 304 and 306 as will be apparent to those of skill in the art upon reading this application.

At 310, transaction product 10 is coupled with backer 200 as generally illustrated with additional reference to FIGS. 11 and 12 to form transaction product assembly 206. Transaction product 10 may be adhered, skinned to, clam packed to, blister packed with or otherwise suitably coupled with backer 200. In one embodiment, account identifier 22 of transaction product 10 is accessible for scanning while transaction product 10 is coupled with backer 200.

Figure 14:
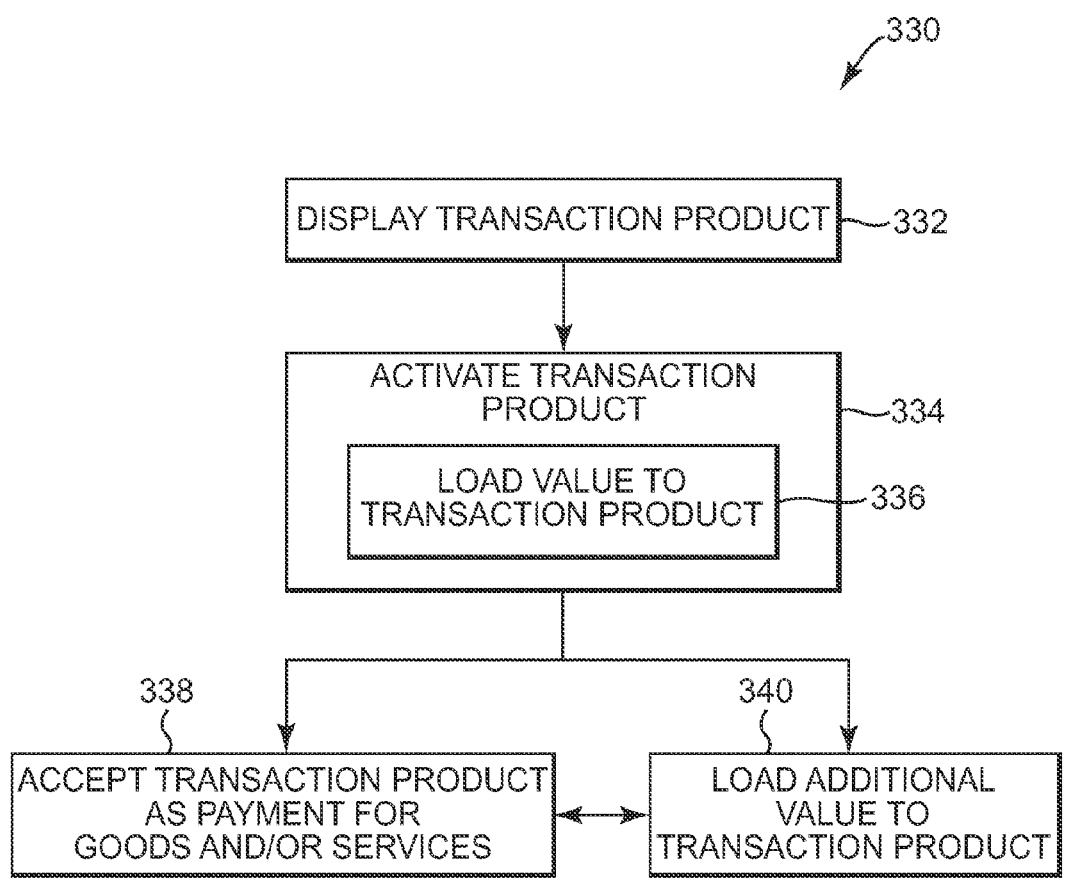
FIG. 14 is a flow chart illustrating a method of encouraging purchase and facilitating use of a transaction product, according to one embodiment the present invention.

FIG. 14 is a flow chart illustrating one embodiment of a method 330 of encouraging purchase and facilitating use of transaction product 10 by consumers and/or recipients. At 332, transaction product 10 is placed on or hung from a rack, shelf or other similar device to display transaction product 10 for sale to potential consumers. For example, additionally referring to FIGS. 11 and 12, backer 200 may be hung from a display rack using aperture 222 such that transaction product 10 is readily visible to potential consumers. In one embodiment, a depiction of transaction product 10 is placed on a web site for viewing and purchase by potential consumers. In one embodiment, during display of transaction product 10, housing 12, crank 20 and light 18 are all visually displayed to the potential consumer. In one example, display of transaction product 10 includes promoting the electrical generative and light features of the transaction product 10 to encourage consumer purchase of transaction product 10, for example in the forms of indicia 210, 212, 218, etc.

At 334, a consumer who has decided to purchase transaction product 10 presents transaction product 10, for example, as part of transaction product assembly 206, to a retail store employee, retail store kiosk, remote terminal or other person or device to scan account identifier 22 to access an account or record linked to account identifier 22. In particular, account identifier 22 is scanned or otherwise accessed, for example through opening 220 of backer 200 to activate transaction product 10. Upon accessing the account or record, then, at 336, value is added to the account or record in the form of monetary value, points, minutes, etc. Thus, transaction product 10 is activated and loaded.

In one example, a predetermined value is associated with transaction product 10 (i.e., associated with the account or record linked to transaction product 10 via account identifier 22) prior to activation and display, but such predetermined value is not initially available for use toward the purchase or use of goods and/or services. In such an embodiment, at 334, transaction product 10 is activated to permit subsequent access to the predetermined value (e.g., subsequent loading on and debiting from the account or record) and no additional value is added during activation such that operation 336 may be eliminated.

Once transaction product 10 is activated and loaded, transaction product 10 can be used by the consumer or any other bearer of transaction product 10 to purchase goods and/or services at the affiliated retail setting (e.g., a retail store or web site) or can be used in exchange for calling minutes, etc. In one embodiment, where transaction product 10 is displayed on a web site at 332, then, at 334, transaction product 10 may be activated in any suitable method and may not require the physical scanning of account identifier 22 to be activated or to otherwise access the associated account or record such as at 336.

In one example, at 338, the retail store or other affiliated retail setting or web site accepts transaction product 10 as payment toward the purchase of goods and/or services made by the current bearer of transaction product 10. In particular, the value currently loaded on transaction product 10 (i.e., stored or recorded in the account or record linked to account identifier 22) is applied toward the purchase of goods and/or services. At 340, additional value is optionally loaded on transaction product 10 at a point-of-sale terminal, kiosk or other area of the retail store, retail web site, or other related setting. Upon accepting transaction product 10 as payment at 338, the retail store or related setting can subsequently perform either operation 338 again or operation 340 as requested by a current bearer of transaction product 10. Similarly, upon loading additional value on transaction product 10 at 340, the retail store or related setting can subsequently perform either operation 340 again or operation 338. In one example, the ability to accept transaction product 10 as payments for goods and/or services is limited by whether the account or record associated with transaction product 10 has any value stored or recorded therein at the time of attempted redemption.

FIG. 15 is a flow chart illustrating one embodiment of a method 360 of using transaction product 10 (e.g., FIGS. 1-6). At 362, a potential consumer of transaction product 10, which is displayed in a retail store or viewed on a web site, decides to and does purchase transaction product 10 from the retail store or web site. It should be understood that transaction product 10 can be displayed and purchased alone or as part of transaction product assembly 206 (FIG. 12) along with backer 200. Upon purchasing transaction product 10, a retail store employee, a retail store kiosk or other person or device scans account identifier 22 (FIGS. 4 and 12) through opening 220 of backer 200 or otherwise reads or accesses account identifier 22. Upon accessing account identifier 22, the account or record linked to account identifier 22 is accessed and activated to load value onto transaction product 10 (i.e., load value to the account or record associated with transaction product 10). In one embodiment, such as where transaction product 10 is purchased at 362 via a web site, actual scanning or other mechanical detection of account identifier 22 may be eliminated and/or manual input of code 24 may be added.

At 364, the consumer optionally gives transaction product 10 to a recipient, such as a graduate, relative, friend, expectant parents, one having a recent or impending birthday, a couple having a recent or impending anniversary, etc. In one embodiment, a plurality of transaction products 10 are purchased and given to party goers, such as at a birthday party, etc. as party favors or gifts. As an alternative, the consumer can keep transaction product 10 for his or her own use thereby eliminating operation 364.

At 366, the consumer, recipient or other current bearer of transaction product 10 interacts with transaction product 10 in its non-transactional capacity. More specifically, the bearer uses the generative and flashlight functionality of transaction product 10. For example, at 368, the bearer pivots crank 20 into the operable position and winds the crank 20, which, in turn, causes generator 120 to produce electrical voltage as described above. The electrical voltage is stored to or at least passes through capacitor 124. At 370, the bearer interacts with switch 16 to move switch from an off position to an on position. Movement of switch 16 to the on position allows electrical flow from capacitor 124 to light 18 thereby illuminating light 18. When the bearer no longer desires illumination of light 18, the bearer moves switch 16 back to the off position, which interrupts electrical flow from capacitor 124 to light 18 thereby shutting of (i.e., terminating illumination) of light 18. Operations 268 and 270 can be repeatedly performed after the other, and in one embodiment, can be performed simultaneously such as when crank 20 is wound while switch 16 is in the on position. In one embodiment, the ability to illuminate light 18 at 370 is limited by the available voltage stored to or otherwise available through capacitor 124 when switch 16 is moved to the on position.

At 374, the consumer or recipient redeems transaction product 10 for goods and/or services from the retail store or web site. At 376, the consumer or recipient of transaction product 10 optionally adds value to transaction product 10, more particularly, to the account or record associated with account identifier 22 included therewith, at the retail store or over the Internet (i.e., via the web site). Upon playing with transaction product 10 at 366, redeeming transaction product 10 at 374 or adding value to transaction product 10 at 376, the consumer or recipient of transaction product 10 subsequently can perform either of operations 366, 374 or 376 as desired. In one embodiment, the ability of the consumer or recipient to repeat redeeming transaction product 10 at 374 is limited by whether the account or record linked with transaction product 10 has any remaining value stored or recorded therein at the time of attempted redemption.

Although primarily described above as occurring at a single retail store or web site, in one embodiment, purchasing transaction product 10 at 362, redeeming transaction product 10 at 374 and adding value to transaction product 10 at 376, can each be performed at any one of a number of stores adapted to accept transaction product 10 or over the Internet. In one example, a number of stores are each part of a chain or are similarly branded stores. In one example, a number of stores include at least one web site and/or at least one conventional brick and mortar store.

Transaction products come in many forms, according to embodiments of the invention. The gift card, like other transaction products, can be "re-charged" or "re-loaded" at the direction of the original consumer, the gift recipient or a third party. The term "loading on" or "loaded on" herein should be interpreted to include adding to the balance of an account or record associated with a transaction product. The balance associated with the transaction product declines as the transaction product is used, encouraging repeat visits or use. The transaction product remains in the user's purse or wallet, serving as an advertisement or a reminder to revisit the associated merchant. Gift cards according to embodiments of the invention provide a number of advantages to both the consumer and the merchant. Other gift cards and transaction products according to embodiments of the invention include loyalty cards, merchandise return cards, electronic gift certificates, calling cards, employee cards, frequency cards, prepaid cards and other types of cards associated with or representing purchasing power, monetary value, etc.

Although the invention has been described with respect to particular embodiments, such embodiments are for illustrative purposes only and should not be considered to limit the invention. Various alternatives and other modifications within the scope of the invention in its various embodiments will be apparent to those of ordinary skill. For example, although primarily described above as including a light circuit with a light, in one embodiment, a different electro-mechanical circuit including a generator configured to drive a different electrical device may be used as an alternative to or in addition to the light.

What is claimed is:

1. A transaction product, comprising:

an electro-mechanical circuit including a mechanical drive member, a generator in mechanical communication with the mechanical drive member, and an electrically driven device in electrical communication with the generator, wherein the electro-mechanical circuit is configured such that when a bearer of the transaction product moves the mechanical drive member, motion from the mechanical drive member is transferred to the generator, the generator uses the motion from the mechanical drive member to create an electrical voltage, and the electrical voltage is transferred to the electrically driven device to selectively power activation of the electrically driven device; and an account identifier linking the transaction product to an account or record, the account identifier being machine readable by a point-of-sale terminal such that value can be added to or deducted from the account or record using the account identifier.

2. The transaction product of claim 1, wherein the account identifier is a bar code.

3. The transaction product of claim 1, wherein the account identifier includes at least one of a bar code, a magnetic strip, a smart chip and a radio frequency identification (RFID) device.

4. The transaction product of claim 1, wherein the mechanical drive member is a crank configured to be wound by the bearer.

5. The transaction product of claim 4, further comprising a housing at least partially enclosing the electro-mechanical circuit; wherein the crank extends at least partially outside the housing and is configured to transition relative to the housing between a storage position and an operable position.

6. The transaction product of claim 5, wherein the crank includes a protrusion, which nests within a recess defined by the housing when the crank is in the storage position.

7. The transaction product of claim 5, wherein the housing defines a first primary panel, a second primary panel spaced from the first primary panel, and a side wall extending between the first primary panel and the second primary panel, and wherein the crank extends through the side wall of the housing.

8. The transaction product of claim 1, further comprising a housing at least partially enclosing the electro-mechanical circuit.

9. The transaction product of claim 8, further comprising a plurality of gears maintained within the housing, wherein motion from the mechanical drive member is transferred to the generator via the plurality of gears.

10. The transaction product of claim 8, wherein the housing includes a base and a cover coupled to the base to enclose a portion of the electro-mechanical circuit therebetween.

11. The transaction product of claim 1, wherein the electrically driven device is a light.

12. The transaction product of claim 11, further comprising a housing at least partially enclosing the electro-mechanical circuit; wherein the light extends through an aperture defined by the housing, and the aperture is tapered outwardly at an outermost portion thereof.

13. The transaction product of claim 1, further comprising a capacitor in electrical communication with the generator and the electrically driven device, wherein the capacitor stores the electrical voltage created by the generator for future use to power activation of the electrically driven device.

14. The transaction product of claim 13, further comprising a housing at least partially enclosing the electro-mechanical circuit, and a switch accessible via an external portion of the housing, wherein bearer interaction with the switch starts and stops transfer of the electrical voltage from the capacitor to the electrically driven device to selectively activate and deactivate the electrically driven device.

15. The transaction product of claim 1, wherein the generator is a dynamo generator.

16. A stored-value product comprising:
  means for linking the stored-value product with at least one of an account and a record having a value associated therewith such that the stored-value product can be used as payment toward a purchase of one or more of goods and services;
  means for introducing mechanical movement to the stored-value product;
  means for receiving the mechanical movement from the means for introducing mechanical movement and for using the mechanical movement to generate electricity;
  means for storing the electricity for future use to drive an electrical device; and
  means for substantially enclosing the means for receiving and using mechanical movement and the means for storing.

17. The stored-value product of claim 16, further comprising the electrical device extending through an aperture defined by the means for substantially enclosing.

18. The stored-value product of claim 17, further comprising means for selectively starting and stopping flow of the electricity between the means for storing the electricity and the electrical device.

19. The stored-value product of claim 16, wherein the electrical device is means for emitting light from the means for substantially enclosing.

20. The stored-value product of claim 16, further comprising means for transferring the mechanical movement from the means for introducing to the means for receiving and for using mechanical movement, wherein the means for introducing and the means for receiving and for using mechanical movement are spaced from one another within the means for substantially enclosing.

21. A method of encouraging purchase and facilitating use of a stored-value card linked to a record or account, the method comprising:
  displaying the stored-value card to a potential consumer including visually displaying a support member, a handle coupled with the support member, and a light coupled with the support member, wherein the handle is configured to allow a bearer to introduce mechanical movement to the stored-value card, and the stored-value card is configured to convert the mechanical movement into electrical energy to illuminate the light; and
  activating the record or account linked to the stored-value card to permit subsequent deductions from a value associated with the record or account for application toward one of a purchase and a use of one or more of goods and services.

22. The method of claim 21, wherein the support member is part of a housing, and during displaying of the stored-value card the handle is at least partially embedded within the housing.

23. A method of using a transaction card, the method comprising:
  winding a crank of the transaction card to activate an electrically driven device, wherein the electrically driven device one of extends through, extends from, and is viewable through a housing of the transaction card; and
  presenting the transaction card as tender toward payment of one or more of goods and services, wherein the transaction card is linked to an account or record storing an associated value available toward payment or one or more of goods and services.

24. The method of claim 23, wherein winding the crank introduces mechanical movement to a generator stored in the housing, and the generator uses the mechanical movement to create electrical voltage, which powers activation of the electrically driven device.

* * * * *